Nov. 4, 1941.   C. H. RIPPL   2,261,664
ELECTRIC WELDING CONTROL APPARATUS
Filed Oct. 21, 1938   2 Sheets-Sheet 1

INVENTOR.
Charles H. Rippl
Harry R. Canfield
BY
ATTORNEY.

Nov. 4, 1941.                C. H. RIPPL                2,261,664
                ELECTRIC WELDING CONTROL APPARATUS
                    Filed Oct. 21, 1938        2 Sheets-Sheet 2

INVENTOR.
Charles H. Rippl
BY Harry R. Canfield
ATTORNEY.

Patented Nov. 4, 1941

2,261,664

UNITED STATES PATENT OFFICE 2,261,664

ELECTRIC WELDING CONTROL APPARATUS

Charles H. Rippl, Cleveland, Ohio, assignor to The Clark Controller Company, Cleveland, Ohio, a corporation of Ohio Application October 21, 1938, Serial No. 236,248

11 Claims. (Cl. 219—4)

This invention relates to electric welding systems and apparatus.

Welding apparatus is known comprising a welding machine having welding electrodes arranged to be moved by fluid pressure, such as compressed air, into pressure engagement with work to be welded; and comprising an electric contactor for closing and opening an electric circuit to the electrodes to cause timed welding current to flow therethrough and through the work, and it is to this class of welding apparatus that my invention more particularly relates.

It is among the objects of the invention:

To provide generally an improved welding apparatus of this class;

To provide improved means for causing the electrodes of the welding machine to remain in pressure engagement with the work for a predetermined time interval after the welding current is interrupted;

To provide improved means for timing the frequency at which successive welds may be made, or, for timing a predetermined delay between successive welds;

To provide improved means for insuring that the electrodes of the welding machine will have been released from the work and again engaged with the work before a succeeding impulse of welding current occurs;

To provide improved means by which the timed period during which the electrodes remain engaged with the work after the welding current ceases to flow and the timed period of delay or frequency between successive welds may be adjusted one independently of the other.

Other objects will be apparent to those skilled in the art to which my invention appertains.

My invention is fully disclosed in the following description taken in connection with the accompanying drawings in which.

Figures 1, 2:
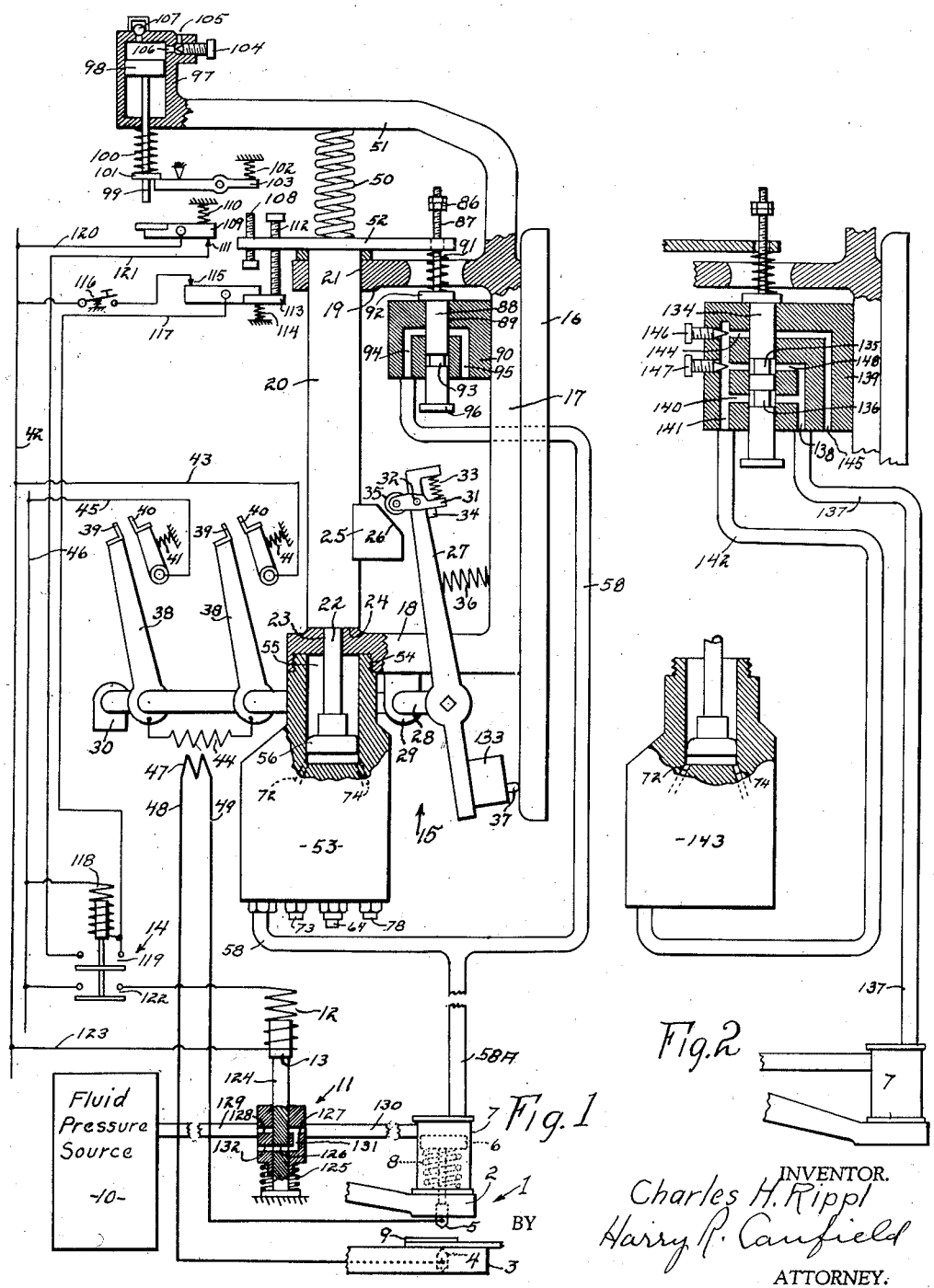
Fig. 1 is a diagrammatic view illustrating an embodiment of my invention.
Fig. 2 is a fragmentary view similar to a part of Fig. 1, showing a modification.

Referring to the drawings, Fig. 1, I have shown at 1, a welding machine comprising upper and lower heads 2 and 3, spaced apart; a stationary electrode 4 associated with the lower head 3; and a movable electrode 5 associated with the upper head 2. The electrode 5 is connected to a piston 6 in a cylinder 7 and normally held in its upper position by a spring 8 in the cylinder and arranged to be moved downwardly, to pressure-engage work 9 between the electrodes, by fluid pressure, such as compressed air, in the cylinder above the piston. At 10 is a source of fluid pressure, such as compressed air, and the diagrammatically illustrated source 10 may be considered as comprising a reservoir of compressed air and any means for maintaining air therein under pressure.

At 11 is illustrated generally an electro-magnetic valve having an energizing winding 12 and an actuating plunger 13.

At 14 is illustrated generally an electro-magnetic relay.

Illustrated generally at 15 is an electric welding current controlling contactor and associated parts which will now be described, and this description will be followed by a more complete description of the welding machine 1, valve 11 and relay 14 in connection with a description of the entire system.

A supporting panel 16 has mounted thereon a frame 17 comprising laterally extending brackets 18 and 19. A plunger 20 reciprocates at its upper end portion in a bore 21 in the bracket 19, and at its lower end which is of reduced diameter as at 22, reciprocates in a bore 23 in the lower bracket 18, the reduction of diameter providing a shoulder 24 on the plunger normally resting on the bracket 18 and providing a downward stop for the reciprocating plunger.

On one side of the plunger is mounted a cam 25, having an inclined cam surface 26. A contactor operator arm 27 is mounted on a shaft 28 oscillatable in a bearing 29 supported on the bracket 18 and in a bearing 30 supported in any suitable manner. On the upper end of the arm 27 is a finger 31 pivoted to the arm 27 at 32, constrained to rock clockwise on the pivot 32 by a spring 33 and stopped in that direction by a stop 34 on the arm 27. A roller 35 on the other side of the pivot 32 is disposed adjacent to the cam face 26.

When the plunger 20 is reciprocated upwardly in a manner to be described, the cam face 26 engages the roller 35 and inasmuch as the finger 31 cannot rotate in the clockwise direction the upwardly moving cam rocks the arm 27 clockwise, the roller 35 rolling down the inclined cam face 26. As the plunger moves upwardly, the roller 35 ultimately rolls off the cam and a spring 36 abutting at one end upon the arm 27 and at the other end on the frame 17, then rocks the arm 27 counterclockwise to its original position, which position is determined by a stop 37 on the arm 27 engaging the panel 16.

When the plunger 20 is reciprocated downwardly in a manner to be described, the cam 25 engages the roller 35 and rocks the arm 31 on the pivot 32 against compression of the spring 33, allowing the cam 25 to pass beyond the roller 35 without moving the arm 27, and at the end of the stroke of the plunger 20, the roller 35 snaps back to its illustrated position by action of the spring 33.

By this means on each reciprocation upwardly of the plunger 20 the arm 27 will first be rocked clockwise and then counter-clockwise and will remain inert when the plunger 20 descends.

On the shaft 28 is mounted a pair of contactor arms 38—38 carrying contacts 39—39. When the arm 27 is rocked as described, it rocks the shaft 28 which rocks the arms 38—38 to move the contacts 39—39 into engagement with stationary contacts 40—40 rendered yieldable by springs 41—41.

When the shaft 28 is rocked in the other direction by return of the arm 27, the contacts disengage.

By this means upon each upward reciprocation of the plunger 20, the contacts 39 and 40 are engaged for a time interval depending upon the velocity of movement of the plunger 20 and upon return movement of the plunger 20 the contacts remain disengaged.

The contacts 39 and 40, which thus are closed for a time period, close a welding circuit to the electrodes of the welding machine 1, as follows. Current flows from a supply main 42 by a wire 43 to one of the contacts 40 and thence through the corresponding contact 39 and arm 38 to the primary 44 of an electric transformer and thence by the other arm 38 and the other contacts 39 and 40 and by a wire 45 to the other supply main 46.

The two terminals of the secondary 47 of the transformer are connected by wires 48 and 49 respectively to the electrodes 4 and 5 of the machine 1, and the electrodes being at the time engaged with the work 9, as will be described, the said timed current flows through the work 9 and makes a weld thereat.

To reciprocate the plunger 20 as described the following means is provided.

A spring 50 abuts at its upper end upon an arm 51 on the frame 17, and at its lower end abuts upon a bar 52 which is on the upper end of the plunger 20 and thus the spring reacts upon the plunger normally tending to reciprocate it downwardly.

Figure 1A:
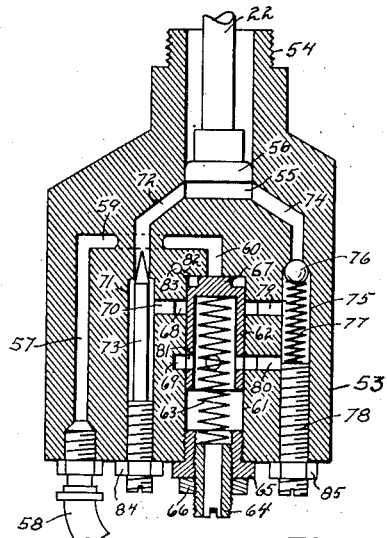
Figs. 1A and 2A are views illustrating, to an enlarged scale and in longitudinal section, parts illustrated in elevation in Figs. 1 and 2 respectively.

A valve housing shown generally at 53 and illustrated more in detail in Fig. 1A, is mounted on the bracket 18, preferably by means of screw threads 54 on the housing threaded into corresponding threads on the bracket 18. The housing 53 has formed therein a cylinder 55 axially aligned with the reduced diameter portion 22 of the plunger, the latter having thereon a piston 56 in the cylinder 55 the reduced diameter portion 22 thus functioning as a piston rod.

Fluid pressure is admitted to the cylinder 55 under the piston 56 to reciprocate it and the plunger 20 upwardly, the fluid pressure being under control of valve means within the housing 53 which will now be described in connection with Fig. 1A.

In the housing 53 is a duct 57 the lower end of which has connected thereto a fluid pressure conduit 58 to be referred to. At the upper end of the duct 57 is a cross duct 59 communicating with a downwardly extending duct 60 which opens into a valve 61 in which reciprocates a trunk piston type valve 62. A spring 63 within the valve abuts at its upper end upon the closed upper end of the valve and at its lower end abuts upon a tubular screw 64, threaded in a thimble 65 which in turn is threaded in the end of the valve cylinder 61. The tubular screw 62 may be adjusted by turning it to adjust the tension of the spring 63 and may be locked in adjusted position by a lock nut 66.

The upper end of the valve 62 is of reduced diameter, as at 67, and under pressure of the spring 63 closes the open end of the duct 60 against fluid pressure therein except at pressures above a predetermined value, at which pressure the fluid pressure moves the valve 62 downwardly against the tension of the spring 63.

The wall of the valve cylinder 61 has formed therein axially spaced annular passages 68 and 69. The annular passage 68 communicates by a duct 70 with a bore 71 which communicates by a duct 72 with the main cylinder 55 below the piston 56. A needle valve 73 is threaded into the bore 71 and the tapered upper end thereof projects into the duct 72 to adjust the effective size thereof.

An exhaust duct 74 also communicates with the cylinder 55 below the piston 56 at one end of the duct and at the other ends opens into a bore 75. A ball check valve 76 normally closes the lower end of the duct 74 and is held in sealing closing engagement therewith by a spring 77 abutting at its upper end upon the ball 76 and at its lower end upon an adjusting screw 78. A duct 79 communicates with the said annular passage 68 and with the bore 75 and a duct 80 communicates with the annular passage 69 and the bore 75. One or more ports 81—81 are provided in the skirt of the valve 62 normally opening into the annular passageway 69.

In the operation of the device as thus far described, when the fluid pressure in the conduit 58, which is a rising pressure as will subsequently appear, attains a predetermined value determined by adjustment of the spring 63, this pressure in the duct 60 will move the valve 62 downwardly. The moment the upper end 67 of the valve uncovers the duct 60, the full upper area of the valve is exposed to the pressure and its continued downward movement is quick and positive, and the valve moves downwardly uncovering the annular passageway 68. Thereupon air from the duct 60 flows through the duct 79 and holds the ball valve 76 firmly in sealing engagement with the end of the duct 74. The fluid under pressure also flows through the duct 70, and passing the needle valve 73, flows into the duct 72 and into the cylinder 55 and moves the piston 56 upwardly causing the plunger 20 to reciprocate upwardly as described.

The rate of upward movement of the piston 55 will be determined by the adjustment of the needle valve 73 and thereby the time duration of the current impulse at the contacts 39 and 40 will be adjustably determined thereby as will now be clear.

When fluid pressure is discontinued in the conduit 58 as will be described later, the spring 63 will return the valve 62 upwardly and again close the duct 60, and in this position of the valve it exhausts the fluid from the cylinder 55 downwardly through the duct 74 lifting the ball check valve 76 and into the bore 75, thence by duct 80, to annular passageway 69, through the said ports 81—81 in the wall of the valve 62, into the interior of the valve and downwardly outwardly through the tubular screw 64.

The piston 56 and plunger 20 therefore are now returned downwardly by the said spring 50.

To avoid operation of the valve 62 by fluid pressure in the duct 60 which might leak around the end 67 of the valve and expose the valve to an operating pressure force before the pressure in the duct 60 has attained the said predetermined value, the space around the reduced diameter end 67 of the valve is at all times exhausted to atmosphere by a bleeder duct 82 communicating to atmosphere with a port 83.

As will be understood, the threaded lower ends of the needle valve 73 and the screw 78 seal the lower ends of their corresponding bores 71 and 75 and they maye be adjusted and locked in any adjusted position by lock nuts 84 and 85.

Referring again to Fig. 1, when the plunger 20 reciprocates upwardly the bar 52 on the upward end of the plunger and moving therewith engages an adjustable stop 86, preferably in the form of two lock nuts on the threaded stem 87 of a piston valve 88 reciprocating in a bore 89 in a block 90 mounted on the frame 17, moving the valve upwardly from its normal position illustrated. When the plunger 20 reciprocates downwardly, the arm 52 engages a spring 91 abutting at its upper end on the lower side of the arm 52 and at the lower end upon the upper end of the valve 88 to restore it downwardly, a head 92 on the valve engaging the upper side of the block 90 to stop and position it in its downward direction.

The valve 88 has a neck 93 of reduced diameter which, when the valve is raised to its upper position, effects communication between a duct 94 and an exhaust duct 95. The upper position of the valve 88 may be stopped and determined by a head 96 on the lower end of the valve engageable with the lower side of the block 90 when the valve moves upwardly, to align the neck 93 with the ducts 94 and 95.

Mounted upon the arm 51 of the frame 17 is a cylinder 97 in which reciprocates a piston 98 having a stem 99 projecting downwardly out of the cylinder. A spring 100 surrounding the stem externally of the cylinder abuts at its upper end upon the cylinder end and at its lower end on a collar 101 on the stem, thus tending to move the piston 98 downwardly. The piston is normally held upwardly by a spring 102 reacting on one end of a pivoted lever 103, the other end of which engages the underside of the collar 101. When the lever 103 is rocked in a manner to be described to release the stem 99, the spring 100 moves the piston 98 downwardly and its rate of movement is adjustably retarded by a needle valve screw 104 which controls the rate at which atmospheric air flows through a port 105, past the needle valve screw 104 and into the cylinder above the piston 98 through a port 106.

When the piston 98 is raised by the spring 102 acting through the lever 103, air may be exhausted from the cylinder above the piston through a ball check valve 107, which, when the piston 98 descends, closes.

The lever 103 is rocked as described by the end of an adjustable screw 108 on the bar 52 when the plunger 20 moves upwardly.

When the piston 98 and stem 99 move downwardly, the stem, at the end of the time interval determined by the retarded movement of the piston 98, engages one end of a pivoted auxiliary contact arm 109 and rocks it against the tension of a spring 110 to move the other end away from a contact 111.

The bar 52 also has an adjusting screw 112, which, when the plunger 20 is in its lower position engages one end of a pivoted auxiliary contact arm 113, and rocks it against the tension of a spring 114 to engage the other end with a contact 115. When the plunger 20 moves upwardly the spring 114 rocks the arm 113 to disengage the contact 115.

The description of other parts of the system of Fig. 1 not hitherto given will now be given in connection with the operation of the apparatus as a whole which follows.

To effect a weld at the work 9, a normally open operator's control contactor 116 is closed by the operator. Thereupon current flows from the supply main 42 through the contactor 116 and through engaged contact 115 and pivoted arm 113, by a wire 117, to the winding 118 of the relay 14 and through the winding to the other supply main 46.

The relay 14 is thereby operated and closes contacts at 119. Thereupon current flows from the line 42 through a maintaining circuit comprising a wire 120, the auxiliary contact arm 109, engaged contact 111, a wire 121, the closed contacts at 119 and the winding 118 to the main 46, whereby the operator's contactor 116 after momentary closure thereof may be released.

When the relay 14 was operated, it also closed contacts at 122 and thereupon current flowed from the supply main 42 by a wire 123 through the winding 12 of the magnetic valve 11 and back through the contact at 122 to the other main 46, causing the plunger 13 of the valve to be lifted. The plunger 13 moves a valve plunger 124 from the lower position shown in which the plunger is held downwardly by a spring 125, to an upper position at which a duct 126 in the plunger effects communication between ducts 127 and 128 in the valve structure.

Fluid pressure thereupon flows from the source 10 by a conduit 129 through the now aligned ducts, 127, 126 and 128 to a conduit 130 and to the cylinder 7 above the piston 6. The fluid pressure moves the piston downwardly and engages the work 9 between the electrodes 5 and 4.

Fluid pressure in the cylinder 7 builds up toward the pressure value of the source and thus firmly engages the electrodes with the work.

The above described conduit 58 also communicates with the cylinder 7 above the piston 6 by a conduit 58A and the rising pressure in the cylinder is communicated to these conduits. Referring to Fig. 1A, the spring 63 is adjusted so that the rising pressure in the conduit 58 will not attain sufficient value to move the valve 62 downwardly until after the pressure in the cylinder 7 has risen sufficiently to fully engage the electrodes with the work with the desired pressure thereat.

When, however, the pressure in the conduit 58 has risen sufficiently, the valve 63 is moved downwardly, and, as described above, fluid pressure is admitted to the cylinder 55 under the piston 56 and the plunger 20 is thereby reciprocated upwardly closing and then opening again the contacts 39—40, thereby sending a welding current of timed duration through the electrodes 4 and 5 and performing the weld at the work.

The upward movement of the plunger 20 also moves the adjustable screw 108 into engagement with the pivoted lever 103 and rocks it against the tension of its spring 102 relieving the outer end of the lever from the collar 101 on the stem 99 of the piston 98. The spring 100 then starts the piston 98 downwardly at a retarded rate of movement determined by the adjustment of the needle valve 104. During its time interval, the electrodes 4 and 5 are still pressure-engaged with the work 9, although the welding current has been interrupted and this time period may be called a cold-hold period. At the end of this time period, the stem 99 of the piston 98 has moved downwardly far enough to engage the free end of the pivoted lever 109 and rocks it disengaging its other end from contact 111 and breaking the above described holding or maintaining circuit for the winding 118 of the relay 114, which relay then moves to restored condition, breaking both its maintaining circuit and the circuit to the winding 12 of the magnetic valve 11.

The spring 125 of the valve thereupon restores the valve plunger 124 downwardly which aligns the duct 126 of the valve plunger with the ducts 131 and 132, cutting off the fluid pressure from the cylinder 7 and connecting the cylinder to atmosphere to exhaust it, and allowing the spring 8 to restore the electrode 5.

When the plunger 20 was reciprocated upwardly as above described to start the cold hold time interval at the piston 98, it also, by engagement of the bar 52 with the stop 86 on the valve stem 87 raised the valve 88 to its upper position thereby connecting the conduit 58 to atmosphere by way of the duct 94, the neck 93 of the valve and the duct 95. The pressure above the valve 62 in the housing 53 is thereupon rendered insufficient to hold the valve down against the spring 63 since the conduit 58 is open at its upper end to atmosphere, at the duct 95. Therefore the valve 62 moves upwardly to the position illustrated in Fig. 1A, thereby opening an exhaust from under the piston 55, past the ball check valve 76 through the duct 80 to chamber 69 through the port or ports 81 in the skirt of the valve, to the interior of the valve, and thence downwardly through the tubular screw 64 to atmosphere. The plunger 20 is now moved downwardly by the spring 50 aided by gravity, and restores the valve 88 to its down or illustrated position. The escape of air from the cylinder 55 through the path just described, continues however, independently of the valve 88 once the valve 62 is restored, and is controlled by the screw 78, the upper end of which overlaps more or less the entrance to the duct 80 so that the downward rate of movement of the plunger is adjustably retarded.

When the plunger 20 reaches its down position and restores the valve 88 the parts are again ready for another operation.

By the means above described it will therefore be observed that the cold-hold period is adjusted by the screw 104 and the frequency or delay period is controlled by the screw 78 each independently of the other.

In the above described structure as shown in the drawing, it will be understood that the conduit 58A extending from the cylinder 7 to the conduit 58 may be a relatively long conduit whereas the conduit 58 from the valve block 90 to the valve housing 53 is relatively short in practice. In any case, the exhaust effected by the valve 88 while sufficient to exhaust the cylinder 55 through the adjustment provided by the screw 78, is insufficient to exhaust the cylinder 7, the exhaust of the latter being controlled by the valve 11.

While the duration of the welding current impulse is determined substantially solely by the adjustment of the needle valve 73 for long current impulses during which the roller 35 remains in contact with the cam surface 26 during the upward movement of the plunger 20, for short current impulses the plunger 20, whose velocity is adjusted by the needle valve 73 may be so rapid that the roller will be given an impulse of movement which will cause the arm 27 to rock sufficiently rapidly that the roller 35 will leave the cam surface. A weight 133 is provided on the arm 27 below its pivot axis and such short impulses will be timed by the spring 36 tending to return the arm to open the contacts and the kinetic inertia of the weight 133 tending to keep them closed. This feature and others of the current timing parts of the contacts above described constitute the subject matter of the co-pending application of Edward G. Beiderman, Serial Number 84,981, filed June 13, 1936, for Improvements in time controlled electric switches, since matured into Patent No. 2,172,-261, dated Sept. 5, 1939, to which reference may be had for a complete description.

The structure, functions and arrangement of the parts in the housing 53 constitute the subject matter of the co-pending applicaion of Charles H. Rippl, Serial Number 120,362, filed January 13, 1937, for Improvements in pressure controls for pneumatically operated switches, and reference may be had thereto.

During long current impulses when the needle valve 73 permits the air to flow at a slow rate to the cylinder 55, pressure under the piston in the cylinder might otherwise have a tendency to leak out past the check valve 76 and in such cases the check valve is held in tight sealing engagement with the end of the duct 74 by pressure in the duct 79 communicated to the underside of the check valve.

The time period during which the downward movement of the plunger is delayed, adjusted by the screw 78 as described determines the frequency of successive operations or the delay which must occur before a succeeding operation can be effected, the adjustment of such time periods therefore being referred to as the frequency adjustment or the delay-period adjustment.

The above described operation is for a single weld, the operator's contactor 116 being only momentarily closed. If it is held closed, the apparatus after restoring as above described, will continuously repeat, making successive welds.

Figure 2A:
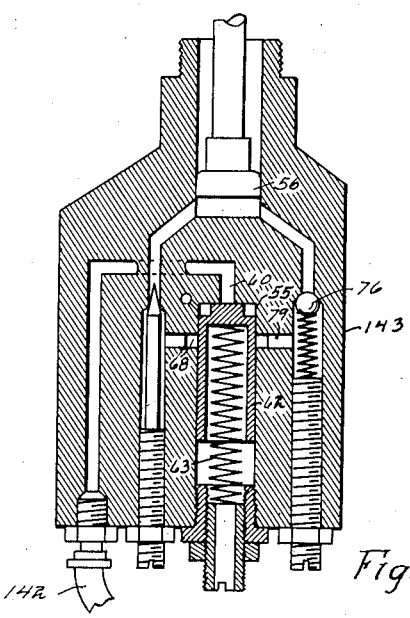

In Figs. 2 and 2A are illustrated a modification of my invention. With this form the cold-hold period is determined and adjusted as described in the form of Fig. 1. In this form, however, when the current impulse has been timed and the plunger has reached the top of its stroke and starts the cold-hold period, a valve 134 is moved to an upper position by the bar 52 on the plunger, in a manner similar to movement of the valve 88 of Fig. 1. The valve has two necks thereon 135 and 136. When the valve is in its normal lower position illustrated, the rising pressure in the cylinder 7 is conducted by a conduit 137 to a duct 138 in the block 139 which supports the valve 134 and in which it reciprocates. The duct 138 communicates with the space around the lower neck 136 of the valve, thence by a duct 140 and a duct 141 with a conduit 142 connected to the valve housing 143 as shown in Fig. 2 and Fig 2A.

The air thus supplied moves the valve 62 of Fig. 1A down and operates the plunger 20 as described for Figs. 1 and 1A.

When the plunger reaches the top of its stroke, it moves the valve 134 to its upper position, thereby effecting an exhaust from under the piston 56, which, by referring to Fig. 2A, allows the air under pressure to flow past the check valve 76 through the duct 79 to the chamber 68 into the space above the valve 62, which is now in its lower position, as will be understood, and out at the duct 60, by way of the conduit 142, through the duct 141 and through a duct 144, around the upper neck 135 of the valve 134 which is now aligned with the duct 144, and out by way of a duct 145 to atmosphere. The pressure under the piston 56 in the valve cylinder 55 above the valve 62 is sufficient to hold the valve downwardly against the spring 63.

An adjusting valve screw 146 controls and adjusts the effective size of the duct 144 and controls the flow of air therethrough and therefore controls the rate at which the piston 56 descends, thereby adjustably controlling the said frequency or delay time period.

In some instances, particularly when the cold hold period is adjusted to be relatively long, the exhaust of air past the needle valve 146 may permit the plunger 20 to descend before the end of the cold hold period, and when the plunger has once descended and restored the valve 134, the plunger will be given air again and will again reciprocate upwardly, sending another unwanted impulse of current to the electrodes. To prevent this, in some cases a second adjusting needle-valve 147 is provided. With the valve 134 in its upper position, back pressure fluid in the conduit 137 is conducted by a duct 148 around the lower neck of the valve 134 (which is now in the upper position), past the needle valve 147, communicating the pressure to the duct 141 and the conduit 142 and providing sufficient pressure under the piston 56 to prevent the plunger from returning, or to prevent it from returning too rapidly.

At the end of such long cold-hold periods, and after the valve 11 has been restored, the pressure in the conduit dies out due to the exhaust of the cylinder 7 and thereupon the pressure supplied to the conduit 142 is discontinued and the plunger can descend, or, if descending can at once complete its stroke downwardly.

By this double adjustment, the return of the plunger can be delayed as long as desired, or if desired may be held at the top of its stroke until after the cold-hold period is ended.

With this arrangement, when the cold-hold periods are short, the adjusting screw 147 can be screwed all the way in to block the port 148, placing all of the adjustment on the screw 146.

My invention is not limited to the exact details illustrated and described. Changes and modifications may be made within the spirit of my invention without sacrificing its advantages and within the scope of the appended claims.

Subject matter illustrated and described but not claimed herein is being claimed in my copending application, Serial No. 270,147, filed April 26, 1939.

I claim:

1. In a welding system, a welding apparatus, a source of fluid pressure connected to the apparatus to operate it, a source of electric current connected to the apparatus to energize it, a valve operable to effect communication of source pressure to the apparatus, a contactor mechanism operable to initiate and interrupt the energizing current to time it and comprising an operably movable element, a delayed operation device arranged to be mechanically set into operation by movement of said movable element to initiate the running of a time interval, and arranged to operate the valve to cut off said communication of fluid pressure from the apparatus at the end of the time interval.

2. In a welding system, a welding apparatus, a source of electric current connected to the apparatus to energize it, a fluid pressure operable contactor mechainsm operable to initiate and interrupt the current to time it and comprising a movable element, a source of fluid pressure connected to the apparatus and to the contactor, a valve operable to effect communication of source fluid pressure to the contactor and apparatus to operate them, a delayed operation device arranged to be mechanically set into operation by movement of said movable element to initiate the running of a time interval, and arranged to operate the valve to cut off said communication of fluid pressure at the end of the time interval.

3. In a welding system, a welding apparatus, a source of electric current connected to the apparatus to energize it, a fluid pressure operable contactor mechanism for initiating and interrupting the current to time it and comprising a movable element, a source of fluid pressure connected to the apparatus and to the contactor, a magnetic valve having an energizing circuit and operable thereby to effect communication of source fluid pressure to the contactor and apparatus to operate them, a delayed operation device arranged to be mechanically set into operation by movement of said movable element to initiate the running of a time interval and comprising electric contacts operable at the end of the time interval and controlling the valve circuit to cause the valve to cut off said communication of fluid pressure at the end of the time interval.

4. In a welding system, a welding apparatus, a source of electric current connected to the apparatus to energize it, a fluid pressure operable contactor mechanism operable to initiate and interrupt the current to time it and comprising a normally restored movable element, a source of fluid pressure connected to the apparatus and to the contactor, a valve operable to effect communication of source fluid pressure to the contactor and apparatus to operate them, a delayed operation device comprising a fluid pressure escapement chamber and a tensioned operating spring, means responsive to movement of the movable element to cause the spring to effect escapement to initiate the running of a time interval, the device being arranged to operate the valve to cut off said communication of fluid pressure at the end of the time interval, and means responsive to restoring of the movable element to restore the device and tension the spring.

5. In a welding system, a welding apparatus, a source of electric current connected to the apparatus to energize it, a contactor mechanism comprising a fluid pressure chamber and a normally restored reciprocably movable element movable in an operating direction responsive to fluid pressure in the chamber, the contactor mechanism comprising means to initiate and interrupt the current to time it during movement of the movable element in said direction, a source of fluid pressure connected to the apparatus and to the contactor chamber, a valve operable to effect communication of source fluid pressure to the contactor chamber and apparatus to operate the contactor and the apparatus, a delayed operation device arranged to be mechanically set into operation by movement of said movable element to initiate the running of a time interval and arranged to operate the valve to cut off said communication of fluid pressure at the end of the time interval, and means to restore the delayed operation device for another operation responsive to return reciprocatory movement of the movable element to its normal position.

6. In a welding system, a welding apparatus, a source of electric current connected to the apparatus for energizing it, a contactor comprising a fluid pressure chamber and a reciprocable element having a normally restored position and movable therefrom by fluid pressure in the chamber, and comprising contact means to initiate and interrupt the current to time it during said movement of the movable element, a source of fluid pressure connected to the apparatus and to the contactor chamber, a valve operable to effect communication of source fluid pressure to the apparatus and chamber, a delayed operation device arranged to be mechanically set into operation by said movement of the movable element to initiate the running of a time interval and arranged to operate the valve to cut off said fluid pressure communication at the end of the time interval, and responsive to be restored for another operation upon return reciprocation of the movable element to normal position, and a valve operable by said pressure-effected movement of the movable element to exhaust the contactor chamber.

7. In a welding system, a welding apparatus, a source of electric current connected to the apparatus for energizing it, a contactor comprising a fluid pressure chamber and a reciprocable element having a normally restored position and movable therefrom by fluid pressure in the chamber, and comprising contact means to initiate and interrupt the current to time it during said movement of the movable element, a source of fluid pressure connected to the apparatus and to the contactor chamber, a valve operable to effect communication of source fluid pressure to the apparatus and chamber, a delayed operation device arranged to be mechanically set into operation by said movement of the movable element to initiate the running of a time interval and arranged to operate the valve to cut off said fluid pressure communication at the end of the time interval, and responsive to be restored for another operation upon return reciprocation of the movable element to normal position, and a valve operable by said pressure-effected movement of the movable element to exhaust the contactor chamber, and the valve being responsive to be restored upon said return reciprocation of the movable element.

8. In a welding system, a welding apparatus, a source of electric current connected to the apparatus to energize it, a fluid pressure operable contactor mechanism operable to initiate and interrupt the current to time it and comprising a normally restored movable element, a source of fluid pressure connected to the apparatus and to the contactor, a valve operable to effect communication of source fluid pressure to the contactor and apparatus to operate them, a delayed operation device comprising a fluid pressure escapement chamber and a tensioned operating spring, means responsive to movement of the movable element to cause the spring to effect escapement to initiate the running of a time interval, the device being arranged to operate the valve to cut off said communication of fluid pressure at the end of the time interval, means responsive to restoring of the movable element to restore the device and tension the spring, and means to delay restoring of the movable element.

9. In a welding system, a welding apparatus, a source of electric current connected to the apparatus to energize it, a contactor mechanism comprising a fluid pressure chamber and a normally restored reciprocably movable element movable in an operating direction responsive to fluid pressure in the chamber, the contactor mechanism comprising means to initiate and interrupt the current to time it during movement of the movable element in said direction, a source of fluid pressure connected to the apparatus and to the contactor chamber, a valve operable to effect communication of source fluid pressure to the contactor chamber and apparatus to operate the contactor and the apparatus, a delayed operation device arranged to be mechanically set into operation by movement of said movable element to initiate the running of a time interval and arranged to operate the valve to cut off said communication of fluid pressure at the end of the time interval, means to restore the delayed operation device for another operation responsive to return reciprocatory movement of the movable element to its normal position, and means to retard the return reciprocatory movement of the movable element.

10. In a welding system, a welding apparatus, a source of electric current connected to the apparatus for energizing it, a contactor comprising a fluid pressure chamber and a reciprocable element having a normally restored position and movable therefrom by fluid pressure in the chamber, and comprising contact means to initiate and interrupt the current to time it during said movement of the movable element, a source of fluid pressure connected to the apparatus and to the contactor chamber, a valve operable to effect communication of source fluid pressure to the apparatus and chamber, a delayed operation device arranged to be mechanically set into operation by said movement of the movable element to initiate the running of a time interval and arranged to operate the valve to cut off said fluid pressure communication at the end of the time interval, and responsive to be restored for another operation upon return reciprocation of the movable element to normal position, a valve operable by said pressure-effected movement of the movable element to exhaust the contactor chamber, and means to retard exhaust of the contactor chamber.

11. In a welding system, a welding apparatus, a source of electric current connected to the apparatus for energizing it, a contactor comprising a fluid pressure chamber and a reciprocable element having a normally restored position and movable therefrom by fluid pressure in the chamber, and comprising contact means to initiate and interrupt the current to time it during said movement of the movable element, a source of fluid pressure connected to the apparatus and to the contactor chamber, a valve operable to effect communication of source fluid pressure to the apparatus and chamber, a delayed operation device arranged to be mechanically set into operation by said movement of the movable element to initiate the running of a time interval and arranged to operate the valve to cut off said fluid pressure communication at the end of the time interval, and responsive to be restored for another operation upon return reciprocation of the movable element to normal position, a valve operable by said pressure-effected movement of the movable element to exhaust the contactor chamber, the valve being responsive to be restored upon said return reciprocation of the movable element, and means to retard the return reciprocation of the movable element.

CHARLES H. RIPPL.